United States Patent [19]

Knop

[11] Patent Number: 4,630,105
[45] Date of Patent: Dec. 16, 1986

[54] SYMMETRIC COLOR ENCODING SHIFT PATTERN FOR A SOLID-STATE IMAGER CAMERA AND DECODING SCHEME THEREFOR

[75] Inventor: Karl H. Knop, Zurich, Switzerland
[73] Assignee: RCA Corporation, Princeton, N.J.
[21] Appl. No.: 636,378
[22] Filed: Jul. 31, 1984
[51] Int. Cl.⁴ .................... H04N 9/077; H04N 9/07
[52] U.S. Cl. ........................................ 358/44; 358/43
[58] Field of Search .................... 358/48, 41, 43, 44

[56] References Cited

U.S. PATENT DOCUMENTS 4,245,241  1/1981  Sato et al. ........................ 358/48
4,330,753  5/1982  Davy ................................ 329/50

OTHER PUBLICATIONS

White, Marvin H., et al., "Characterization of Surface Channel CCD Image Arrays at Low Light Levels", IEEE Journal of Solid-State Circuits, vol. SC-9, No. 1, Feb. 1974, p. 1.

Primary Examiner—John W. Shepperd
Assistant Examiner—Randall S. Svihla
Attorney, Agent, or Firm—Eugene M. Whitacre; Peter M. Emanuel; Lawrence C. Edelman

[57] ABSTRACT

A color encoding filter is provided for use with a camera having a solid-state imager. The filter comprises a plurality of rows of color filter elements, each row having a sequence of color filter elements which repeats after a predetermined number P of elements, wherein P is greater than or equal to eight (8). Sequential rows of the color filter elements are shifted in the row direction by at least two elements from the preceding row such that the combination of vertically aligned filter elements from adjacent rows provides a sequence of at least two independent color combinations. The color combination sequence repeats after a number of combinations equal to the predetermined number P and has like color combinations symmetrically disposed about one color combination of the color combination sequence. A color signal decoding scheme is also disclosed, which features analog signal processing that makes advantageous use of the color filter symmetry.

18 Claims, 18 Drawing Figures

ASSIGNEES PRIOR APPLICATION

ASSIGNEES PRIOR APPLICATION

WHERE:

A = | K L M |
    | M L K |

B = | O N M |
    | M N O |

C = | L | or | N |
    | N |    | L |

O=M

| K | L | M | N | M | N | M | L | K | L | M |
|---|---|---|---|---|---|---|---|---|---|---|
| M | L | K | L | M | N | M | N | M | L | K |
| M | N | M | L | K | L | M | N | M | N |   |
| M | N | M | N | M | L | K | L | M | N |   |
| K |   |   |   |   |   |   |   |   |   |   |

| K | L | M | N | L | N | M | L | K | L | M |
|---|---|---|---|---|---|---|---|---|---|---|
| M | L | K | L | M | N | L | N | M | L |   |
| L | N | M | L | K | L | M | N | L | N |   |
| M | N | L | N | M | L | K | L | M |   |   |

| Ye | B | Cy | R | Cy | R | Cy | B | Ye | B | Cy |
|----|---|----|----|----|---|----|---|----|---|-----|
| Cy | B | Ye | B | Cy | R | Cy | R | Cy | B |   |
| Cy | R | Cy | B | Ye | B | Cy | R | Cy |   |   |
| Cy | R | Cy | R | Cy | B | Ye | B |   |   |   |

Fig. 4c

Fig. 5a O=M AND N=K

| K | L | M | K | M | K | M | L | K | L |
|---|---|---|---|---|---|---|---|---|---|
| M | L | K | L | M | K | M | K | M | L |
| M | K | M | L | K | | | | | |

Fig. 5b O=M=K

| K | L | K | N | K | N | K | L | K | L |
|---|---|---|---|---|---|---|---|---|---|
| K | L | K | L | K | N | K | N | K | L |
| K | N | K | L | K | L | | | | |

Fig. 5c O=M AND N=K

| Cy | Ye | G | Cy | G | Cy | G | Ye | Cy | Ye |
|----|----|----|----|----|----|----|----|----|----|
| G | Ye | Cy | Ye | G | Cy | G | Cy | G | |
| G | Cy | G | Ye | | | | | | |

Fig. 5d O=M=K

| Cy | R | Cy | B | Cy | B | Cy | R | Cy | R |
|----|---|----|---|----|---|----|---|----|---|
| Cy | R | Cy | R | Cy | B | Cy | B | | |
| Cy | B | Cy | R | | | | | | |

Fig. 5e O=M AND N=K

| W | Cy | G | W | G | W | G | Cy | W | Cy |
|---|----|---|---|---|---|---|----|---|----|
| (G) | (Cy) | W | Cy | G | (W) | (G) | W | G | |
| G | W | G | Cy | W | Cy | G | W | G | |
| G | W | G | W | G | Cy | W | Cy | G | |

| W | Cy | G | W | G | W | G | Cy | W | Cy |

SYMMETRIC COLOR ENCODING SHIFT PATTERN FOR A SOLID-STATE IMAGER CAMERA AND DECODING SCHEME THEREFOR

The present invention relates to color cameras and, more particularly, to color-encoding filters for solid-state imager cameras and to a decoding scheme for the signal derived from such filters.

BACKGROUND OF THE INVENTION

The availability of solid-state image sensors (imagers) such as MOS or CCD devices, has renewed the interest in color encoding schemes for cameras including less than three images for sensing the three colors which define an image. The inherent geometrical stability of the solid-state imager allows schemes which would be extremely difficult to realize in practice with pick-up tubes, such as vidicons or saticons. In the past, many color-encoding filters have been developed. However, in general, these prior art filters have resolution and crosstalk problems which make them unsuitable for use in some high quality, solid-state imager camera systems.

For example, in a frame-transfer CCD imager (also known as a field-transfer CCD imager), the whole imaging area is photosensitive. The individual photosensitive collection sites, called picture elements or "pixels" are defined in the horizontal direction by vertical channel stops and in the vertical direction by horizontal gates having 2, 3 or B 4 phase signals applied thereto. Interlace of the even and odd fields, which cover separate areas in the image for a normal TV signal, is achieved by vertical overlap of pixels in alternate fields. Illustratively, FIG. 1 shows a portion of a frame-transfer imager 10 with the dotted horizontal lines showing vertical direction boundaries for even fields and the solid horizontal lines showing vertical direction boundaries for odd fields. TV line numbers are shown to the left and right of imager 10. A pseudo-interlace is obtained by applying the multiphase signals to the horizontal gates so as to define the pixel structure in the two fields with a vertical offset corresponding to one unit of vertical resolution therebetween. This mode of operation is equivalent to summing over two units of vertical resolution from adjacent lines where a pixel is the combination of two units of vertical resolution in the vertical direction in each field. The vertical resolution limit is not affected by this, but contrast is reduced for vertical spatial frequencies near the Nyquist limit of the vertical sampling.

It should be noted that the present invention is also useful with solid-state imagers other than frame-transfer CCDs, for example, with imagers which allow operation with non-overlapping sampling elements such as an interline-transfer CCD imager on an MOS diode array imager. The detailed discussion of the present invention, however, will be devoted to where the invention is particularly useful, i.e., in a frame-transfer type of imager.

The overlapping interlace mode of a frame-transfer CCD which does not allow access to single units of vertical resolution, represents a stringent boundary condition for which many prior art color-encoding patterns are not well suited. For instance, a classical example of a prior art color-encoding pattern, the so-called Bayer pattern is shown in FIG. 2a, wherein R, G and B refer to red, green and blue colors of the color transmissive filter elements, respectively. When used with a frame-transfer CCD, only two types of signals, R+G and B+G, would be alternately generated. As is well known, to solve for three unknown quantities (R, G, and B), three equations are required. Thus, for decoding a full (three) color signal, a minimum of three different color signals are required. Since the Bayer pattern only generates two types of color signals it is not suitable for use with the frame-transfer type of imager.

One class of color-encoding filter patterns well suited for frame-transfer CCDs are described in my prior U.S. patent application Ser. No. 559,460 filed Dec. 12, 1983, jointly with R. Morf and E. Heeb, entitled "Encoding Pattern for Single Chip CCD Camera Processing Scheme" and assigned to RCA Corporation. These patterns are referred to therein as "shift" patterns. Shift patterns have a first row of color filter elements which define a sequence of P color elements. Each sequential row is formed by filter elements which repeat the prior color sequence but shifted in the row direction with respect to the prior row by a certain number of filter elements S, wherein $0 < S < P$. For constructing a color camera, each element of the filter is aligned with the pixel structure of the camera imager. When used in conjunction with the previously described frame-transfer CCD imager, the vertical dimension of the individual filter elements are two units of vertical resolution high.

FIG. 4a of our prior application is reproduced here as FIG. 2b and illustrates a shift pattern of the type wherein P=6 and S=2. This pattern contains three color filter elements, green (G), cyan (Cy) and white (W), having a sequence G,Cy,G,G,W,G. The sequence of each sequential row is shifted two elements to the left from the sequence of the preceeding row. Thus, the pattern repeats in the vertical direction after P/S or three rows. If P/S is not an integer, the pattern would repeat vertically after P rows.

It has been found that when shift patterns of the type illustrated in FIG. 2b are used in conjunction with a CCD imager having a relatively high vertical crosstalk (light energy illuminating one filter row is received by collection sites of the imager as if the light energy also illuminated the vertically adjacent filter rows) only two independent color signals can be decoded. For example, if the vertical crosstalk is 33⅓%, when light is directed at the second filter row, it is received by the lines of collection sites of the imager as if the filter rows both above and below the second row were also illuminated. This causes 66⅔% of the light which illuminated the second filter row to be received in the line of imager collection sites optically aligned with the second filter row and the remaining 33⅓% of the light which illuminated the second filter row to be received in adjacent lines of image collection sites. Thus, as noted by inspection of FIG. 2b, since the filter pattern repeats in the vertical direction every third line, irrespective of which filter element is illuminated, only two color signals are provided by the filter i.e. GGW and GGCy. In practice, this type of pattern is noticeably degraded at CCD vertical crosstalk levels exceeding 25%, which crosstalk levels can not be reduced economically with today's technology, as far as known by the inventor herein. A color filter pattern described in our prior application and illustrated herein as FIG. 2c has a vertical period of four filter elements and is less sensitive to vertical crosstalk due to the greater number of different vertically adjacent filter elements. Unfortunately, as noted in our prior application, no analog color decoding scheme has been found which is suitable for processing the signals generated by this pattern. Although a generalized digital signal processing circuit such as described in our prior application can be utilized to provide satisfactory decoding, it would require a substantial number of digital integrated circuits. Consequently the decoding circuitry would require a substantial volume and consume a significant amount of power, which requirements are not compatible with small size and light weight of a portable color camera, for which the color encoding filter/CCD imager combination is ideally suited.

Therefore, it is desirable to provide a shift type color encoding filter pattern having a color sequence which has a vertical repetition sequence of not less than four rows and which lends itself to relatively simple and therefore economical analog decoding.

SUMMARY OF THE INVENTION

In accordance with the principles of the present invention, a color-encoding filter for a color camera comprises a plurality of rows of color filter elements, each row having a sequence of color filter elements which repeats after a predetermined number P of elements, wherein P is greater than or equal to eight (8), and sequential rows of the color filter elements are shifted in the row direction by at least two elements from the preceding row such that the combination of vertically aligned filter elements from adjacent rows provides a sequence of at least two independent color combinations. The color combination sequence repeats after a number of combinations equal to the predetermined number P and has like color combinations symmetrically disposed about one color combination of the color combination sequence.

BRIEF DESCRIPTION OF THE DRAWING

FIGS. 3a and 3b show an embodiment of a color encoding filter in accordance with the principles of the present invention having a generalized color sequence;

FIGS. 4a, 4b and 4c show two generalized color encoding filters and one specific color-encoding filter, each having four colors arranged in accordance with the present invention;

FIGS. 5a, 5b, 5c, 5d and 5e show two generalized color encoding filters and three specific color encoding filters, respectively having three colors arranged in accordance with the present invention and FIG. 5f shows a cross-section view of the top row of the filter shown in FIG. 5e;

DETAILED DESCRIPTION OF THE DRAWING

Figure 1:
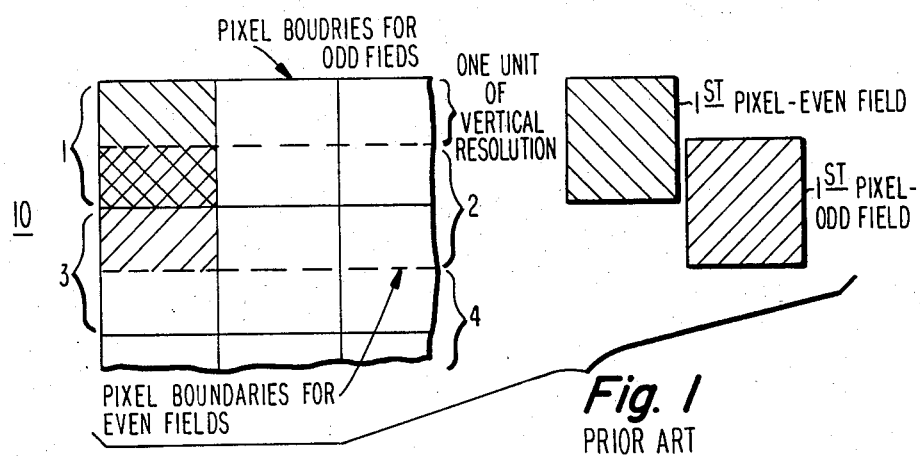
FIG. 1, as discussed above, shows a portion of a frame-transfer imager as known in the prior art.
Figure 2A:
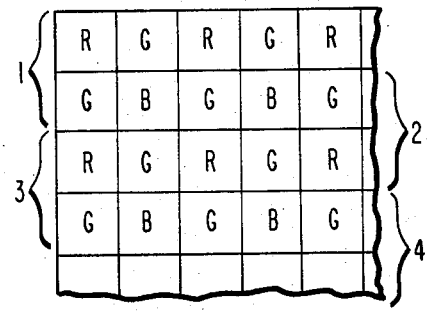
FIG. 2a, as discussed above, shows a Bayer pattern color-encoding filter and FIGS. 2b and 2c, as discussed above, show color-encoding filters of our prior application.
Figure 2B:
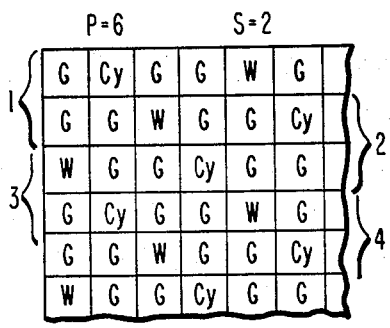
Figure 2C:
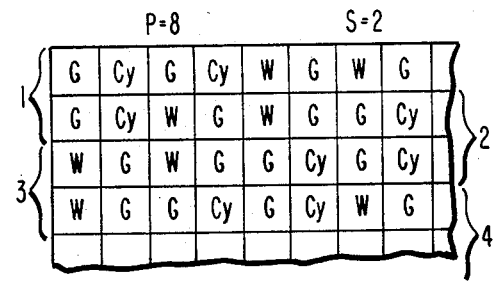
Figures 3A, 3B:
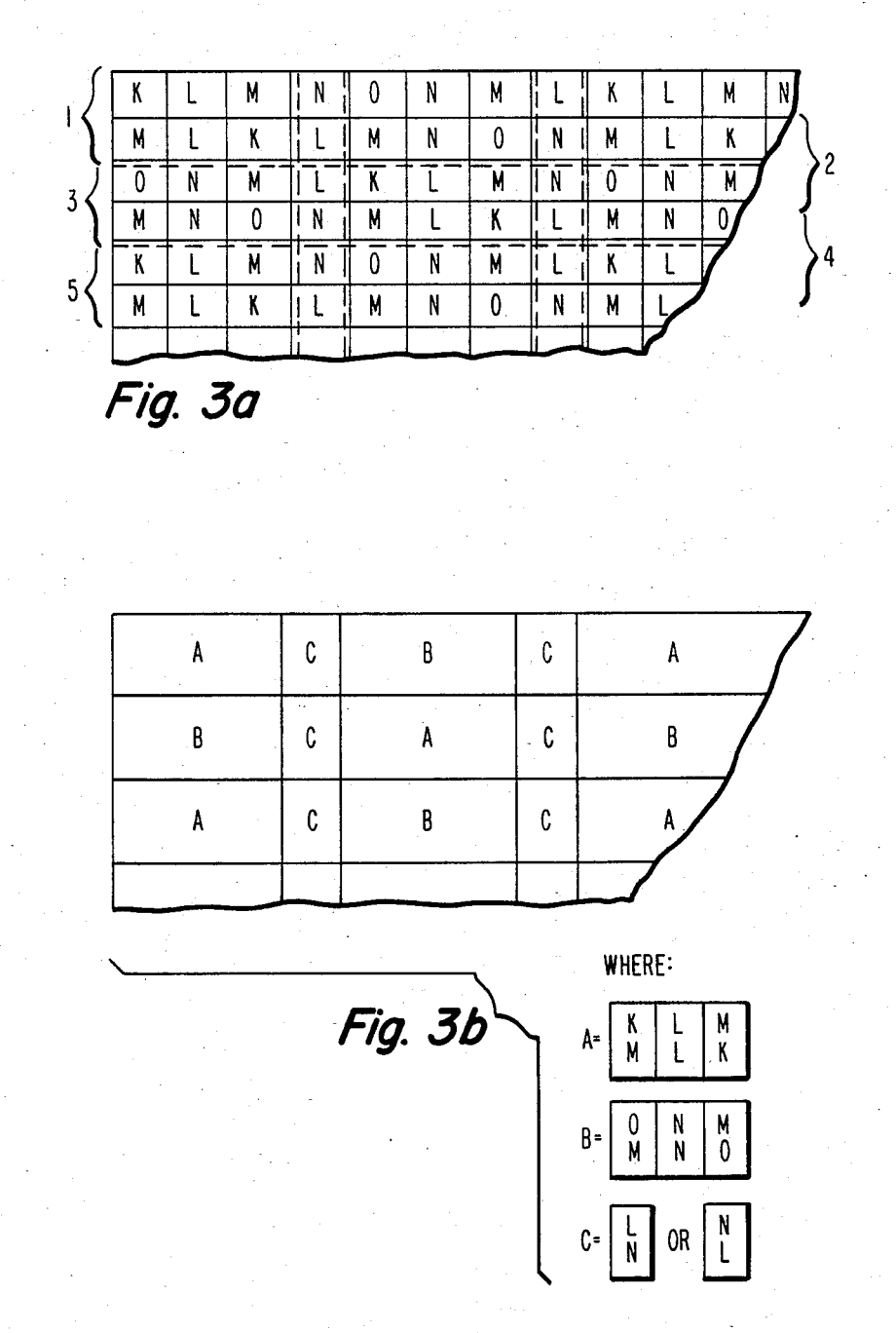

Generally, for patterns of the type shown in FIG. 2c having a color sequence of 8 and a shift of 2, the repetitive color sequence for vertically aligned color combinations from adjacent filter rows will not produce the same combination sequence when read from left to right as when read from right to left. For example, GG, CyCy, GW, CyG, WW, GG, WG, GCy and GG is not the same as GG, GCy, WG, GG, WW, CyG, GW, CyCy and GG. However, color filter patterns constructed in accordance with the principles of the present invention do include this feature and are referred to hereinafter as "symmetric" shift patterns. An example of a symmetric shift pattern having a generalized color sequence in accordance with the principles of the present invention having p=8 and S=2 is illustrated in FIG. 3a. The letters K, L, M, N and O refer to a reasonable selection of up to five different colors for each of the color filter elements. Reasonable refers (1) to color selection for the filter pattern which can be fabricated relatively inexpensively and (2) to the selection of a minimum of three different and independent colors, based upon the recollection that this is what is required to produce the three primary color signal components i.e., red, green and blue, which are representative of a color image. Independent colors refers to colors which are colormetrically different from each other. E.G., red, green and yellow would not provide three independent signals since yellow is the combination of red and green and thus, there would be no way to develop a blue signal. Since, as previously noted, a frame-transfer CCD imager has a vertical overlapping pixel structure for achieving interlace, the eight color combination sequence for each TV line is as follows: LL, MK, NL, OM, NN, OM, NL and MK. This sequence of color combinations has relatively high symmetry as indicated by the fact that it reads the same from left to right as it does from right to left when followed by the next sequence, beginning with LL. Stated another way, one color combination of the sequence, namely NN, has similar or like color combinations OM, NL and MK symmetrically disposed about it. As a result of computer simulation of many patterns, it is believed that this sequential symmetry arranged in a shift pattern is what allows the advantageous analog signal processing, which will be described in greater detail later on.

FIG. 3b indicates the structure of FIG. 3a outlined in dashed lines, and more clearly indicates the symmetric nature of the FIG. 3a pattern. As indicated in FIG. 3b, the pattern can be subdivided into three types of color combination blocks, A, B, and C, arranged in a regularly repeating pattern. The A block corresponds to color combinations KM, LL and KM; the B blocks correspond to color combinations OM, NN and OM; and the C blocks correspond to color combination LN. Note that the order of the colors of each combination, such as KM or MK is irrelevant for decoding purposes, since it does not alter the colorimetric content of the combination.

With five colors to be chosen amongst the seven basic choices of R, G, B, Cy (Cyan), Ye (yellow), Mg (magenta) and W (white), there are more than ten thousand different symmetric shift filter patterns available, with possibly several hundred of which provide reasonable performance. However, patterns with five different colors are not very desirable since their manufacture is more costly than color filters with less colors. Thus, it is desirable to reduce the number of different colors in the symmetric pattern to four or even three colors, thereby further increasing the degree of symmetry in the pattern and also narrowing in on the best performing of the less costly patterns. Filters in which this has been achieved will next be described.

Two main subclasses of symmetric color shift patterns having only four different colors have been found to yield good results. The first subclass is derived from the most general symmetric shift pattern, shown in FIG. 3a, by setting color O equal to color M. Due to the symmetry of the eight-color sequence (as indicated, for example, by the top filter row in FIG. 3a which has color sequence symmetry about both color elements O and K), this is equivalent to setting color K equal to color M. The resulting four color pattern is shown in FIG. 4a. The second subclass, shown in FIG. 4b, sets color O equal to color L. Again, due to symmetry this is equivalent to setting color K equal to color N. One particularly good choice of four colors for the first subclass (FIG. 4a) has color K equal yellow, L equal blue, M equal cyan and N equal red and is shown in FIG. 4c. Other four color patterns can be derived from FIG. 4c by replacement of colors, such as W for Ye, and by transposition of colors, such as B and Cy. Good performing patterns and their color selections can be found by trial and error within the general guidelines of the invention.

A symmetric color filter pattern having only three different colors can be derived from the basic pattern of FIG. 3a by setting color O equal to color M and color N equal to color K. Again, due to the symmetry of the sequence this is equivalent to setting color K equal to color M and color O equal to color L. The resulting filter is shown in FIG. 5a. The FIG. 5a pattern can also be derived by combining the two conditions which led to the two preferred four-color patterns of FIGS. 4a and 4b. A number of patterns with only three different colors which yield good performance belong to this subclass. Furthermore, some good three-color patterns are also found in the form shown in FIG. 5b, which is obtained from the original pattern in FIG. 3a by setting colors M and O equal to the color K. Several examples of good performance three-color patterns will next be described.

The symmetry of patterns 5a and 5b does not guarantee good performance for any choice of three colors K, L and M or N, respectively. One example of a good color selection for the pattern of FIG. 5a is obtained by setting color K equal to cyan, the color L equal to yellow and the color M equal to green. An example of a good color selection for the pattern of FIG. 5b is to set the color K equal to cyan, L equal to red, and N equal to blue. These two examples are illustrated as FIG. 5c and FIG. 5d, respectively. Several more good patterns can be derived from the patterns of FIGS. 5c, 5d and 5e, by color replacement and transpositions.

The practical problem of manufacturing these color filters may lead to a strong preference for certain colors. For example, a particular color filter fabrication process may allow relatively easy fabrication of the three colors green, cyan and white. Thus, if for the pattern of FIG. 5c the color yellow is replaced by cyan and the color cyan by white, the pattern illustrated by FIG. 5e results. Filters having these colors can be fabricated as shown in FIG. 5f, which illustrates the fabrication of the top row of the filter of FIG. 5e, by depositing on a glass substrate 510 two color filter layers 512 and 514. Layer 512 is transmissive to cyan and layer 514 is transmissive to yellow. Since green is the superposition of yellow and cyan, the green filter elements of the filter of FIG. 5e are formed by both the yellow and cyan layers while the yellow layer is etched away for forming the cyan elements and both layers are etched away for forming the white elements. The selective etching for the pattern can be performed by standard photoresistive techniques. For a more detailed discussion of a technique for forming color filters, reference may be made to a copending U.S. patent application Ser. No. 512,541, now U.S. Pat. No. 4,534,620, filed on July 11, 1983, in the name of M. Gale et al. and also assigned to RCA Corporation.

It should be noted, however, that the relative ease with which the colors can be fabricated is not always the dominant reason for their selection. Another important consideration is the average transmission characteristic of the filter over a given area which, for each of the color filter patterns, approximates the chromatic composition for a luminance (Y) signal, i.e., $Y=0.59G+0.30R+0.11B$. Although the previously described color selections yield good performance, other selections are possible and under some circumstances may perform even better.

As previously noted, an advantage of the inventive patterns illustrated above is that they all provide decodable signals in the face of high vertical crosstalk. For example, as previously noted, the shift pattern of FIG. 2b degrades to a two color signal pattern of GGW and GGCy at a vertical crosstalk of $33\frac{1}{3}\%$. However, on the other hand, at $33\frac{1}{3}\%$ vertical crosstalk of the FIG. 5e pattern, four different color signals GGW, CyCyW, WWCy and GGG can be provided by the filter elements of the pattern, an example of such elements being indicated as circled elements in FIG. 5e. Thus, since at least three color signals can be provided by the elements of the FIG. 5e pattern at $33\frac{1}{3}\%$ vertical crosstalk, it is possible to decode the red, green and blue color signals representative of the image.

Figure 6:
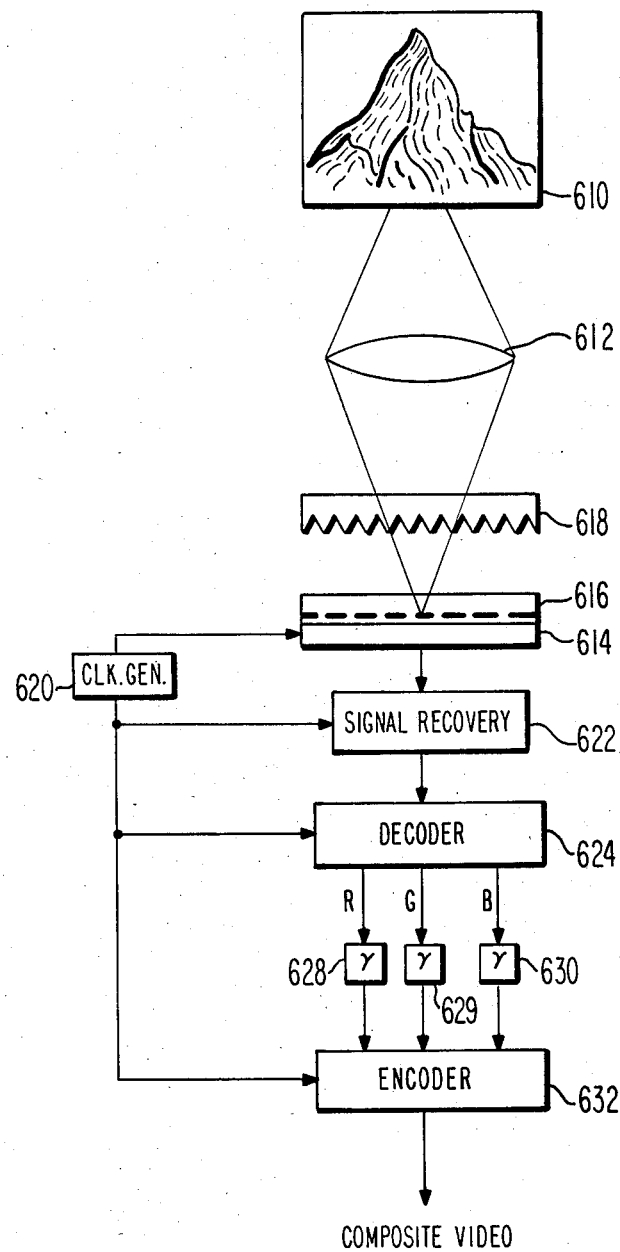
FIG. 6 is a block diagram of a color camera having analog signal decoding for a filter pattern in accordance with the present invention.

Referring to FIG. 6 a block diagram of a single chip color camera is illustrated. The color signal decoding can be performed by digital techniques but is advantageously performed by the analog decoder to be described with respect to FIG. 7. An image 610 is focused by a lens 612 onto a CCD imager 614. A checkerboard color filter 616, e.g., of the type shown in FIG. 5e, is formed over the photosensitive surface of imager 614. A diffuser 618 is interposed between the image 610 and filter 616 to reduce aliasing effects. As is well known, optical diffusers must be used with color-encoding filters to reduce strong color beats and artifacts which result from certain spatial frequencies in the image. It has been found that the use of a two-dimensional diffuser whose characteristics correspond to an averaging over an area of two by two color filter elements, efficiently reduces these effects and provides satisfactory performance. Since the bandwidth of such a diffuser coincides with the Nyquist limit of the sampling by the CCD imager itself, luminance resolution is essentially unaffected. CCD imager 614, under the control of a clock signal generator 620, provides a sampled analog signal at its output. A signal recovery circuit 622 develops a video signal from the sampled analog signal provided by the imager, and may correspond to any of several well-known CCD signal recovery circuits, such as a correlated double sampling circuit. The recovered video signal is then applied to an analog decoder 624 (to be described next) for developing the red, green and blue color representative video signals. These color representative video signals are applied to gamma correction circuits 628, 629 and 630, whose outputs are applied to an encoder 632 for providing a composite video signal at its output corresponding to a selected standard, such as NTSC.

Figure 7:
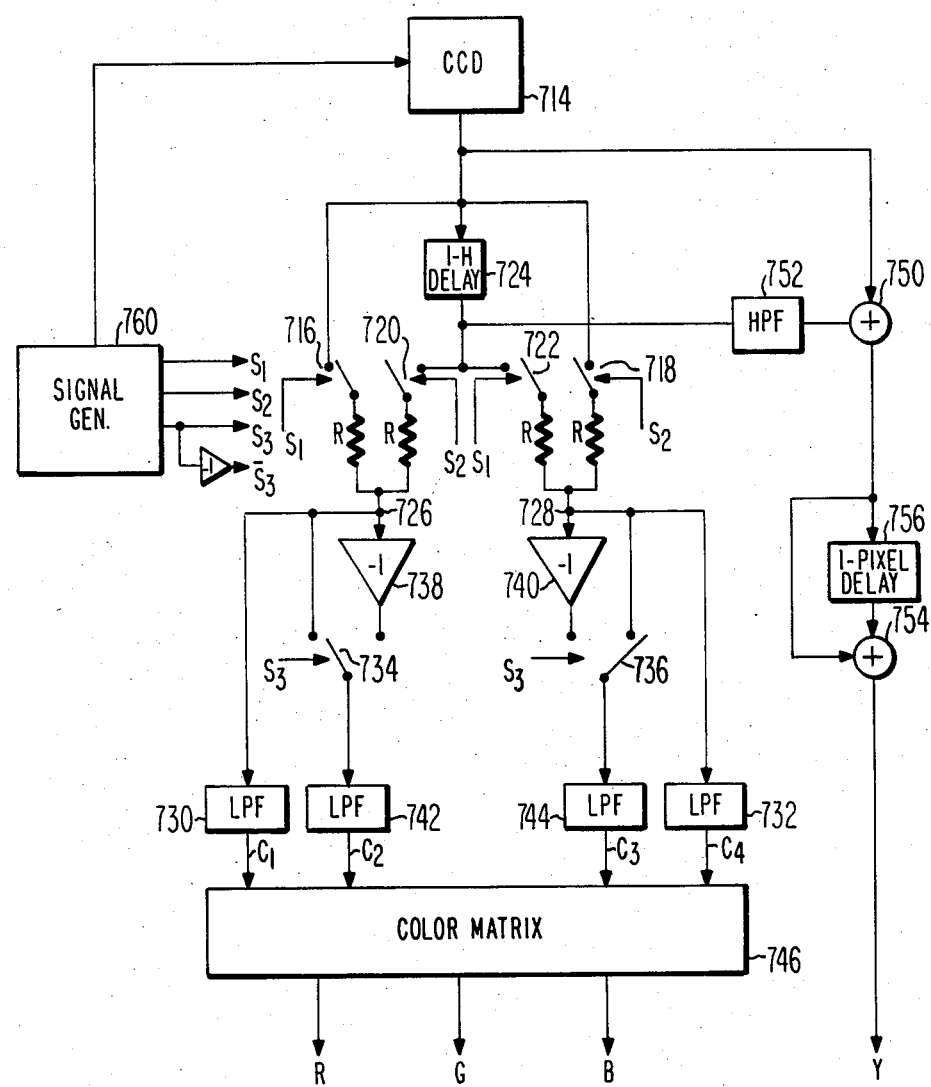
FIG. 7 shows details of the analog decoder of FIG. 6.

Referring to FIG. 7, a general processing scheme of an analog decoder for use in the camera of FIG. 6 is shown. The decoder is well suited for analog circuitry and takes full advantage of the symmetry of the FIG. 3a type patterns by developing signals having a colorimetric content which are continuously representative of the A+C blocks and the B+C blocks. These continuous signals are then filtered to provide at least three different signals to a matrix for developing the R, G and B color signals representative of the scene.

Figure 8:
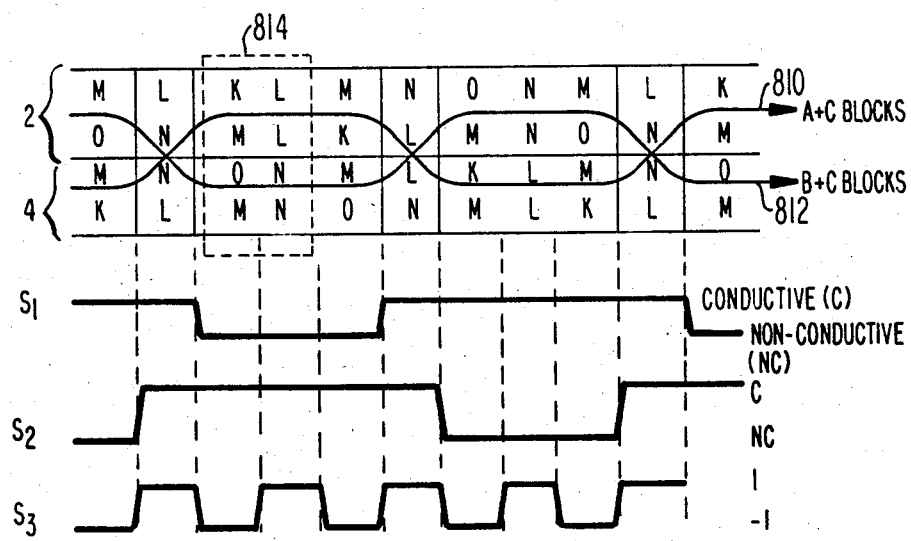
FIG. 8 shows waveform diagrams useful for describing the operation of the decoder of FIG. 7.

The color encoded signal from CCD imager 714, after processing by signal recovery circuits (not shown), is fed undelayed to the inputs of switches 716 and 718 and delayed by one TV line (1-H) by delay 724 to the inputs of switches 720 and 722. Switches 716 and 722 are controlled by a switching signal $S_1$ illustrated in FIG. 8 and switches 718 and 720 are controlled by a switching signal $S_2$ illustrated in FIG. 8. Switches 716, 718, 720 and 722 sort the undelayed and delayed TV line signals (lines 2 and 4 of FIG. 3a are illustrated in FIG. 8) into the A and B blocks of the generalized pattern illustrated in FIG. 3b. Switches 716 and 720 are conductive during recurrent time periods for sampling the A blocks and the C blocks before and after the sampled A blocks, and switches 718 and 722 are conductive during recurrent time periods for sampling the B blocks and the C blocks before and after the sampled B blocks. The conduction of switches 716 and 720 is illustrated by line 810 of FIG. 8 and the conduction of switches 718 and 722 is illustrated by line 812 of FIG. 8. The outputs of switches 716 and 720 are combined by equal valued resistors R and applied to a point 726 and the outputs of switches 718 and 722 are combined by equal valued resistors R to a point 728. Thus, at point 726 a continuous chroma signal is developed corresponding to the A blocks plus an average of the C blocks and at point 728 a continuous chroma signal is developed corresponding to the B blocks plus an average of the C blocks, respectively. Low pass filters 730 and 732 are coupled to points 726 and 728, respectively, for developing at their outputs two chrominance signals C1 and C4, respectively, having an average colorimetry as follows:

C1=average of 1 A block and an average of 2 C blocks
$C_1 = [KM+LL+MK+(NL+NL)/2]/4$
$C_1 = (KM+LL+MK+NL)/4$
$C_1 = (2K+3L+2M+N)/4$ similarly,
$C_4 = (L+2M+3N+20)/4.$ Single-pole double-throw switches 734 and 736 have one of their inputs coupled to receive the color signals from points 726 and 728, respectively, and the other of their inputs coupled to receive an inverted color signal from points 726 and 728, via inverters 738 and 740, respectively. The conduction of switches 734 and 736 are controlled by switch signal $S_3$ shown in FIG. 8 for sampling the signals provided at their inputs and providing them to low pass filters 742 and 744, connected to the outputs of switches 734 and 736, respectively, for developing two further chrominance signals C2 and C3. The combinations of inverters 738 and 740 and signal switches 734 and 736 followed by low pass filters subtracts out the low frequency information (i.e., information which is the same from element to element) and therefore serve as high pass filters, as well known in the art. Signals C2 and C3 have an average colorimetry as follows:

$C_2 = (-2K+3L-2M+N)/4$
$C_3 = (+L-2M+3N-20)/4$

The four chrominance signals $C_1$ through $C_4$ are applied to a color signal matrix 746 which combines a fixed percentage of each of the $C_1$ through $C_4$ chrominance signals for developing at the matrix output the R, G and B primary color signals representative of the scene.

A signal generator 760 of conventional design provides the clocking signals for the CCD and generates the $S_1$, $S_2$ and $S_3$ switch signals.

In the simplest form, matrix 746 consists of a resistive network for forming the R, G and B color signals from only three of the four signals available, e.g., the $C_1$, $C_2$ and $C_3$ chrominance signals, as follows:

$R = aC_1 + bC_2 + cC_3$
$G = dC_1 + eC_2 + fC_3$
$B = gC_1 hC_2 + iC_3.$

Although only three independent color signals are sufficient to decode the R, G and B primary color signals, it has been found that under some circumstances, such as low light level conditons, better results may be obtained when the fourth chrominance signal, $C_4$, is also used.

The luminance signal (Y) is generated by combining blocks of constant colorimetric content, referred to as a "unit cell". Each unit cell is two elements wide and four elements deep, and consists of $K+2L+2M+2N+0$. One unit cell is indicated by dashed lines 814 in FIG. 8. A signal representative of sequential unit cells (i.e., the Y signal) is developed by adding together the color combinations for two TV lines, which is accomplished by adder 750 and delay 724, and by adding together color combinations which are adjacent to each other, which is accomplished by adder 754 and a one-pixel delay 756. The Y signal is developed at the output of adder 754. For minimizing the loss of vertical detail (which is a low frequency signal component in the TV line direction) due to the summing over two TV lines, a highpass filter (HPF) 752 having a cutoff frequency of about 1 MHz provides the delayed signal to adder 750. Thus, the low frequency information is not summed over two lines and loss of vertical detail is minimized.

It should be noted that although a color-encoding filter for decoding three color signals has been illustrated, the principle of the invention also applies to color cameras having multiple solid state imagers, and each imager is used to supply only a portion of the color signals. An example of such a camera would be one that uses one imager for developing a green signal and another imager having a color-encoding filter in accordance with the principles of the invention for developing the red and blue color signals.

What is claimed is:

1. A color-encoding filter for a color camera, comprising:
a plurality of rows of color filter elements, each row having a sequence of color filter elements which repeats after a predetermined number P of elements, wherein P is greater than or equal to eight (8), each of said rows of the color filter elements being shifted in the row direction by at least two elements from the preceding row such that combination of vertically aligned filter elements from adjacent rows provides a sequence of at least two independent color combinations, said color combination sequence being repeated after a number of combinations equal to said predetermined number P and having like color combinations symmetrically disposed about one color combination of said color combination sequence.

2. The camera according to claim 1 wherein P equals 8 and each of said rows are shifted two elements from the preceding row.

3. The camera according to claim 2 wherein said sequence of color filter elements comprises color filter elements arranged in the order of K, L, M, N, O, N, M, L wherein K, L, M, N and O refer to five different colors.

4. The camera according to claim 2 wherein said sequence of color filter elements comprises color filter elements arranged in the order of K, L, M, N, L, N, M, L wherein K, L, M and N refer to four different colors.

5. The camera according to claim 2 wherein said sequence of color filter elements comprises color filter elements arranged in the order of K, L, M, N, M, N, M, L wherein K, L, M and N refer to four different colors.

6. The camera according to claim 5 wherein the K element is substantially yellow, the L element is substantially blue, the M element is substantially cyan and the N element is substantially red.

7. The camera according to claim 2 wherein said sequence of color filter elements comprises color filter elements arranged in the order of K, L, M, K, M, K, M, L wherein K, L and M refer to three different colors.

8. The camera according to claim 7 wherein the element K is substantially cyan, the element L is substantially yellow and the element M is substantially green.

9. The camera according to claim 7 wherein the element K is substantially white, the element L is substantially cyan and the element M is substantially green.

10. The camera according to claim 2 wherein said sequence of color filter elements comprises color filter elements arranged in order of K, L, K, N, K, N, K, L wherein K, L and N refer to three different colors.

11. The camera according to claim 10 wherein the element K is substantially cyan, the element L is substantially red and the element N is substantially blue.

12. A camera including an imager having discrete collection sites arranged in television lines for collecting charges generated in response to energy received from a scene, means for developing an image-representative signal in response to a readout of television lines of said charges generated by said imager, a decoder for decoding said image-representative signal, and a color-encoding filter including a plurality of rows of color filter elements interposed between said scene and said imager collection sites, through which said energy received from said scene must pass respective pairs of adjacent rows of said color-encoding filter being optically aligned with corresponding ones of said television lines of collection sites of said imager such that blocks of filter elements having the same colorimetric content as each other appear spaced apart from each other in each of said television lines but appear adjacent one another in pairs of adjacent television lines; said decoder comprising:

delay means having an input coupled to receive said image-representative signal and an output for providing a delayed image-representative signal;

first switch means having an input coupled to the input of said delay means to receive an undelayed image-representative signal, and having an output;

second switch means having an input coupled to the output of said delay means to receive said delayed information-representative signal delayed from said undelayed information-representative signal by a predetermined amount, and having an output;

signal combining means having first and second inputs coupled to outputs of said first and second switch means, respectively, and a common output for combining signals provided at its inputs;

switch signal generating means for generating a first switch signal for controlling the conduction of said first switch means and a second switch signal for controlling the conduction of said second switch means, said first and second switch means being rendered conductive by said first and second switch signals, respectively, for selectively and repeatedly passing those portions of said undelayed and delayed signals, respectively, to said combining means which are representative of energy received from said scene which passed through said blocks of said color-encoding filter which have the same colorimetric content as each other;

frequency selective filter means coupled to the common output of said combining means and having a first frequency selective path for providing a first continuous chroma signal and a second frequency selective path for providing a second continuous chroma signal; and a color matrix having first and second inputs for respectively receiving said first and second continuous chroma signals for matrixing said chroma signals for providing first and second color signals representative of first and second color components of said scene.

13. Apparatus according to claim 12 wherein said delay means delays said information-representative signal by an amount corresponding to the time required to read out charges from one television line of collection sites of said imager.

14. Apparatus according to claim 12 wherein said first frequency selective path has a low pass filter response characteristic.

15. Apparatus according to claim 14 wherein said second frequency selective path has a high pass filter response characteristic.

16. A color television camera for developing a color television signal, comprising:

imaging means including an array of photosensitive elements arranged in a plurality of rows;

color-encoding filter means including a plurality of rows of color filter elements optically aligned with corresponding rows of photosensitive elements of said imaging means and having a sequence of color filter elements which repeats after a predetermined number P of elements, wherein P is greater than or equal to eight (8), each of said rows of the color filter elements being shifted in the row direction by at least two elements from the preceding row such that combination of vertically aligned filter elements from adjacent rows provides a sequence of at least two independent color combinations, said color combination sequence being repeated after a number of combinations equal to said predetermined number P and having like color combinations symmetrically disposed about one color combination of said color combination sequence;

means for imaging a scene through said filter means onto said imaging means for causing the storage of scene information at individual photosensitive elements of said array which are representative of discrete portions of said scene;

means for simultaneously reading out from said imaging means the stored scene information caused by imaging through two adjacent rows of said filter means; and means for processing said stored information read out of said imaging means to develop said color television signal.

17. The camera according to claim 16 wherein:
said imaging means comprises a charge-transfer device imager.

18. The camera according to claim 17 wherein:
said imager comprises a frame-transfer charge-coupled device imager.

* * * * *